[11] 3,603,685

[72] Inventors Lee O. Heflinger
 Torrance;
 Ralph F. Wuerker, Palos Verdes Estates, both of, Calif.
[21] Appl. No. 886,258
[22] Filed Dec. 18, 1969
[45] Patented Sept. 7, 1971
[73] Assignee TRW Inc.
 Redondo Beach, Calif.

[54] MULTIFREQUENCY LASERS FOR HOLOGRAPHIC CONTOURING
 11 Claims, 3 Drawing Figs.
[52] U.S. Cl. .................................................... 356/109, 350/3.5, 331/94.5
[51] Int. Cl. ...................................................... G01b 9/02, G02b 27/00
[50] Field of Search........................................... 350/3.5; 331/94.5; 356/2, 106, 109

[56] References Cited
 UNITED STATES PATENTS
 3,471,800 10/1969 Congleton et al............. 331/94.5
 3,492,600 1/1970 Zitter ........................... 331/94.5
 3,482,184 12/1969 Schneider et al. ............ 331/94.5

OTHER REFERENCES
 Roess, Proc. of the IEEE, Vol. 52, Feb. 1964, pp. 196–7 (331-94.5).

Hildebrand et al., Jour. of the Optical Society of America, Vol. 57, No. 2, Feb. 1967, pp. 155–162 (350-3.5).

Daehler et al., Jour. of Applied Physics, Vol. 38, No. 4, March 1967, p. 1980 (331-94.5).

*Primary Examiner*—David Schonberg
*Assistant Examiner*—Ronald J. Stern
*Attorneys*—Daniel T. Anderson, Edwin A. Oser and Jerry A. Dinardo ABSTRACT: A ruby or other solid laser is made to generate two or more closely adjacent optical frequencies. By illuminating an object to be recorded holographically with the laser light, range contours are generated when the hologram is reconstructed. The range contours can be made to have distances on the order of 5 millimeters or more by utilizing a ruby laser. To this end, one of the two boundaries of the optical cavity for the laser is formed by a suitable mode selector, such, for example, as a Fabry-Perot resonant reflector, a prism or a grating. The thickness of the resonant reflector is so selected that two or more frequencies may be generated within the lasing linewidth of the laser. Preferably, in order to obtain better contrast, the optical length of the cavity is a multiple of the optical thickness of the resonant reflector.

The invention described herein was made in the performance of work under a NASA contract and is subject to the provisions of Section 305 of the National Aeronautics and Space Act of 1958, Public Law 85-568 (72 Stat. 435; 42 U.S.C. 2457).

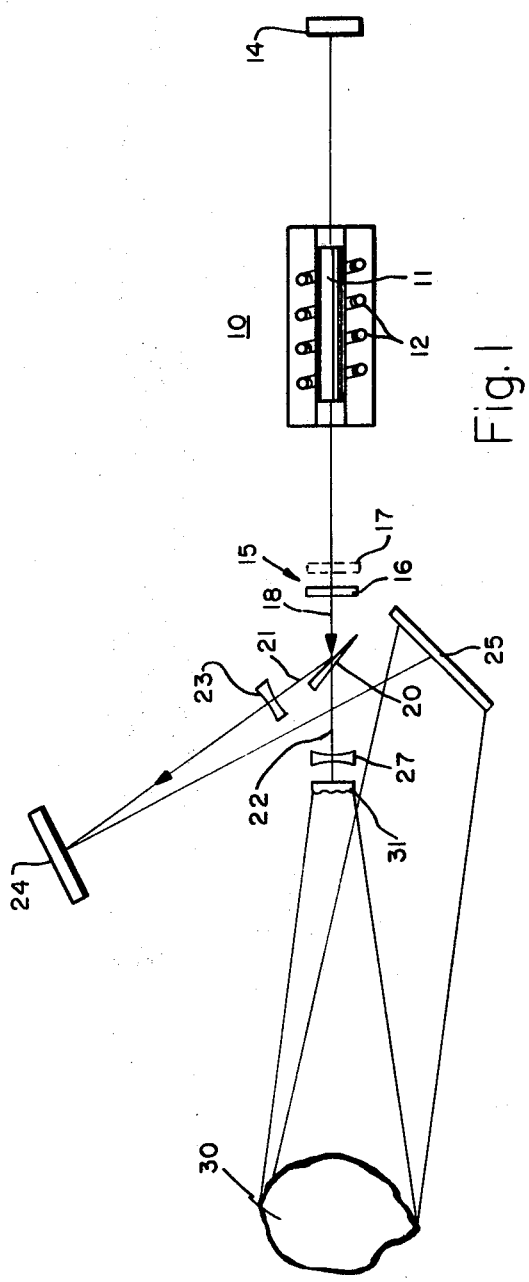
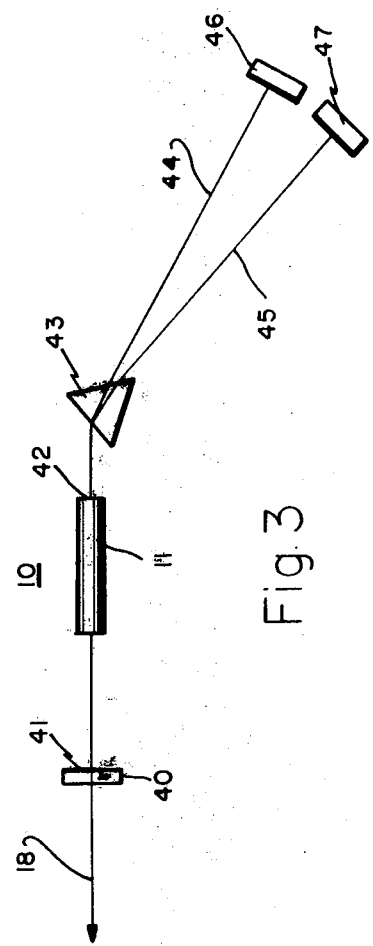
Lee O. Heflinger
Ralph F. Wuerker
INVENTORS
ATTORNEY

MULTIFREQUENCY LASERS FOR HOLOGRAPHIC CONTOURING

CROSS-REFERENCE TO RELATED APPLICATION

The present U.S. Pat. application is related to the copending application to Ralph F. Wuerker, filed concurrently here with Ser. No. 886,077 entitled "Apparatus for Recording Holograms of Objects with Range contours," and assigned to the assignee of the present invention. The copending application discloses a holographic apparatus and method of generating successively two separate frequencies by means of a single ruby laser or utilizing two ruby lasers to obtain two separate frequencies simultaneously for a single-exposure hologram.

BACKGROUND OF THE INVENTION

This invention relates generally to holography, and particularly relates to holographic contouring for generating range contours on an object to be recorded.

It has been proposed in the past to generate holographic contour maps by means of gas lasers which are capable of lasing at two separate frequencies. Since generally the two frequencies of a gas laser are widely separated, the spacing of the resulting contour ranges are very close, that is, small fractions of an inch or even fractions of a millimeter. Such a spacing of the range contours is much too narrow for many practical applications. What is desired here is a contour spacing on the order of a few millimeters, for example, suitable for gauging the configuration of large mechanical parts or of complex structures, such, for example, as a parabolic antenna.

The copending application to Wuerker previously referred to discloses both a holographic apparatus and a holographic method which makes possible to generate contour spacings of the desired width. However, this technique either requires to take two separate exposures on one hologram or to use two separate lasers. In the first place, where two separate exposures are necessary it is absolutely imperative that the object not move between the two exposures. This, of course, requires that the object be stationary within a fraction of a wavelength between the two exposures.

Where two separate lasers are required, this of course, will increase substantially the price of the holograms made therewith. Furthermore, the provision of two separate lasers disposed in line makes the experimental setup more cumbersome and requires more space.

It is accordingly an object of the present invention to provide a holographic apparatus permitting the recording of objects with contour maps thereon with a single exposure of a single laser.

Another object of the invention is to provide holographic apparatus of the type referred to which permits the recording of holograms of an object with contour spacings thereon by a single, very short duration light pulse and in such a manner that the contour spacing is controllable and relatively narrow within the order of millimeters or longer, depending on the wavelengths radiated by the laser.

A further object of the present invention is to provide holographic apparatus of the type referred to which requires little additional equipment and which permits to record holograms with or without Q-switching of the laser.

SUMMARY OF THE INVENTION

In accordance with the present invention there is provided a holographic apparatus for taking holograms of an object and for providing range contours on the object when the hologram is viewed. To this end the apparatus comprises a pulsed laser and optical means for pumping the laser. The laser has a given lasing linewidth. An optical cavity is provided which encloses the laser. This cavity includes a light reflector for the coherent light developed by the laser. The light reflector defines one end or boundary of the cavity. The other end of the cavity is defined by optical means for selecting at least two lines, each having a frequency within the lasing linewidth. Accordingly the object to be recorded is now illuminated at the same time by light of two adjacent, distinct frequencies. This, of course, will generate the desired range contours on the object. The distance between adjacent range contour lines is determined by the frequency difference between the two adjacent lines.

The light-sensitive recording medium is now obtained by providing means for splitting the light from the laser into a scene beam and a reference beam. A hologram is disposed in a predetermined plane. Means are provided for directing the reference beam onto the recording medium and for directing the scene beam first onto the object and then onto the hologram.

By way of example, the laser may be a pulsed ruby laser. Also the optical means for selecting the two lines preferably consists of a Fabry-Perot resonant reflector, such as a slab of sapphire or quartz.

BRIEF DESCRIPTION OF THE DRAWINGS

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings in which:

FIG. 1 is a schematic view of a holographic apparatus in accordance with the present invention, including a ruby laser arranged to generate at least two separate frequencies;

FIG. 3 illustrates a modified laser and associated equipment in accordance with the present invention for selecting two separate frequencies within the lasing linewidth of a ruby laser.

DESCRIPTION OF THE PREFERRED EMBODIMENTS

Figure 2:
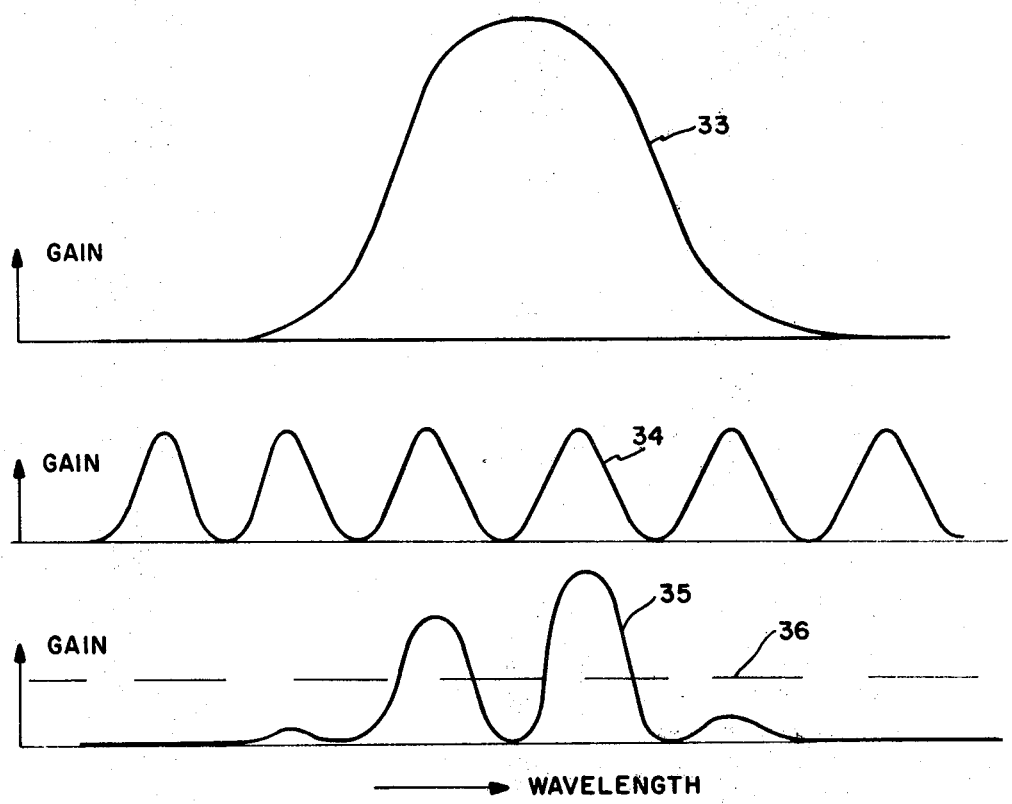
FIG. 2 is a set of curves illustrating gain as a function of wavelength, showing respectively the natural lasing linewidth of a ruby laser, the reflectivity of a resonant reflector and the resulting gain of a resonant reflector in an optical cavity.

Referring now to the drawings, and particularly to FIG. 1, there is illustrated a holographic apparatus in accordance with the present invention. The apparatus of FIG. 1 includes a laser 10, which may, for example, include a ruby rod 11. The ruby rod 11 may be surrounded by a helically wound flashlamp 12 for pumping the ruby rod so as to permit lasing of the rod. However it should be noted that it is not essential for the present invention to utilize a ruby rod. Instead any other laser may be used which permits pulsed operation with high power. Among such lasers may be mentioned a neodymium laser, which may either be neodymium glass or neodymium in an yttrium aluminum garnet, pulsed dye lasers, and the like. Besides having a high pulsed output power, the laser 10 should also have a sufficiently wide lasing linewidth, such for example, as on the order of 0.25 Angstrom (A).

The laser rod 10 is disposed in an optical cavity. One end or boundary of the optical cavity is formed by a light reflector 14. This may, for example, be a mirror 14 dielectric coated at its plane front surface and which reflects substantially all of the light, say 99 percent of the light. The other end of the optical cavity may, for example, be formed by a Fabry-Perot etalon or resonant reflector, generally indicated at 15. Such a resonant reflector may, for example, consist of a single slab 16 of sapphire or of two slabs 16, 17 of quartz. The operation and purpose of the resonant reflector 15 will be subsequently explained. In general, however, it may be stated that the resonant reflector 15 serves the purpose to select two closely adjacent frequencies within the lasing linewidth of the laser for the purpose of generating range contours on an object.

While the resonant reflector 15 has been shown as forming one end of the optical cavity, the optical cavity may also be defined by a suitable, partially reflected mirror. In that case the resonant reflector 14 may be disposed anywhere within the resonant cavity.

The lasing linewidth is that linewidth obtained when the laser operates in a simple cavity with plane mirrors at each end and is generally different from the optical linewidth of the same line obtained when the lasing material is excited in a conventional manner. For example, for a ruby laser the lasing linewidth was found to be 0.25 A. This corresponds to a certain temperature, such, for example, as 5° C. (Centigrade) although the linewidth is not particularly sensitive to temperature. This has been more fully explained in the prior paper by the applicants which was published on July 1, 1969 in Applied Physics Letters, Volume 15, Number 1, pages 28 through 30.

The laser 10 in general operates in a conventional manner and develops a laser output beam 18 which impinges on a suitable beam splitter 20. The beam splitter 20 may, for example, consist of a glass wedge as shown in FIG. 1. It splits the laser beam 20 into a reference beam 21 and a scene beam 22. The reference beam 21 is reflected by the front surface of the beam splitter 20 and may be enlarged in size by a negative lens 23. It may be reflected by a light reflector 24 so that it impinges on a light-sensitive recording medium. The recording medium may, for example, consist of a suitable photographic film or plate or of a photochromic material. The light reflector 24 may be a front-surface mirror of aluminum. The negative lens 23 should be so positioned that the resulting reference beam 21 fills the entire area of the recording medium.

The scene beam 22 may also be enlarged by a negative lens 27 and is directed toward an object 30 to be recorded. The light scattered by the object 30 is then also recorded on the recording medium 25. Interference between the waves scattered from the object 30 and the reference beam 21 permits to record both the amplitude and the phase of the scattered scene beam to permit the usual reconstruction of the object by the light of a suitable reference beam.

A light diffuser 31 may optionally be interposed into the path of the scene beam, preferably between the negative lens 27 and the object 30. The diffuser preferably is so constructed that the apparent light source does not appear too large. In other words, light diffuser 31 should preferentially scatter in the forward direction. Such a light diffuser may readily by obtained by a ground glass diffuser having a thin coating of a lacquer with substantially the same index of refraction as that of the glass of the diffuser 31.

The operation of the holographic apparatus of the invention will now be discussed and particularly that of the laser 10. As mentioned before, the lasing linewidth of a ruby laser 10 is 0.25 A. Thus referring to FIG. 2, curve 33 illustrates the gain of a ruby laser such as shown at 10 as a function of wavelength. This, of course, is the natural lasing linewidth of the ruby. A resonant reflector, such as Fabry-Perot etalon produces a gain or reflectivity which is periodic function of wavelength such as shown by curve 34 of FIG. 2. This is due to the fact that light reflects from both outer surfaces of a resonant reflector slab such as 16 or from two such slabs such as shown at 16 and 17. Thus high gain is only obtained for certain wavelengths or frequencies for which the reflections from the two surfaces add. For other wavelengths the two reflections cancel producing substantially zero intensity.

The effective thickness of the resonant reflector is the optical thickness which is the product of the physical thickness and the index of refraction. The index of refraction for quartz is 1.46 and that of sapphire is 1.76. Accordingly it will be seen that a sapphire resonant reflector has a greater optical thickness and also a higher reflectivity of light due to its higher index of refraction.

It has now been found in accordance with the present invention that by using a resonant reflector of a suitable thickness it is possible to select two or more wavelengths or frequencies within the lasing linewidth of the laser. This is shown by curve 35 of FIG. 2 which illustrates the gain resulting from the contributions of both the laser and the resonant reflector. Dotted line 36 indicates the lasing threshold. Thus by properly selecting the optical thickness of the resonant reflector it is feasible to select two or more frequencies within the curve 33, that is, within the natural lasing linewidth. For certain choices of resonator thickness there will be several frequencies above the lasing threshold which can produce the desirable effect of sharpening the appearance of the contour lines in the holographic image.

It is, of course, well know, that if a hologram is made of an object illuminated simultaneously with coherent light of two separate colors, that is, of course, of two adjacent frequencies, range contours are generated on the object when the hologram is reconstructed. These range contours have a distance S given by the following formula:

$$S = \frac{\lambda_1 \lambda_2}{2\Delta\lambda} \simeq \frac{\lambda^2}{2\Delta\lambda}, \qquad (1)$$

where $\lambda_1$ is one of the frequencies $\lambda_2$ is the other frequency and $\Delta\lambda$ is the frequency difference. Accordingly it will be seen from formula 1. that the spacing between adjacent range contours is inversely proportional to the difference in wavelength.

As pointed our in applicant's paper above referred to, photographs of holographic images have been obtained with contour spacings of 7.7 millimeters and 23 millimeters. Thus, in other words, contour spacings of 5 millimeters and more may be obtained, the smallest spacing depending on the lasing linewidth, which is 0.25 A in the case of a ruby laser.

It may also be mentioned that the entire optical cavity generates a periodic gain curve of the type shown by curve 34, but having very close spacings so it is substantially invisible. It has also been found that the contour spacing exactly equals the optical thickness of the resonator.

In order to obtain maximum contrast, that is, to maximize the visibility of the contour fringes, it is feasible to adjust the entire length of the optical cavity to be an integral of the optical length of the resonant reflector. However this is not essential and contour fringes without such adjustment of the total length of the optical cavity have been obtained. It may also be necessary for good contrast to control the temperature of the laser, for example, to 5° C. Furthermore as shown in applicant's paper above referred to, it is possible to provide more than two sets of range contours by utilizing more than two wavelengths.

Finally it should be mentioned that the laser may also be Q-switched in a conventional manner, for example, by electrically controlling the plane of polarization through a Q-switched Kerr cell. Alternatively, it is feasible to use an additional mode selector, such as a dye cell which may contain cryptocyanine. Good results have been obtained with and without Q-switching and with and without a dye cell.

Prior art lasers have been used with a resonant reflector in the resonant cavity of the laser. However, it was always the aim to operate the laser in such a way that only a single frequency or wavelength is generated. Accordingly the thickness of the reflector of prior art lasers was chosen so that only one maximum of the reflectivity curve is contained within the lasing linewidth of the laser. In accordance with the present invention the usefulness of obtaining radiation of several separate wavelengths has been recognized. As explained hereinabove, this may be achieved by using a resonant reflector which is sufficiently thick so that several maxima of the reflectivity curve are contained within the lasing linewidth.

A holographic apparatus in accordance with the present invention does not necessarily require a resonant reflector. Instead, some other means may be used for selecting at least two lines, each having a frequency within the lasing linewidth of the laser. Such an arrangement is illustrated in FIG. 3. Here the laser 10 may again consist of a ruby rod 11, the flashlamp having been omitted. One end of the optical cavity may be formed by a partial light reflector 40 which may have a partially reflecting dielectric coating 41 facing the ruby laser 10. The light emerging from one end 42 of the ruby laser may now be refracted by prism 43 in accordance with its wavelength. Accordingly as shown schematically by the lines 44 and 45 two adjacent frequencies or wavelengths of the ruby light are refracted respectively into totally reflectors 46 and 47. These may, for example, consist of substantially 100 percent reflecting mirrors 46 and 47.

It will readily be seen that such an arrangement produces gains for only two separate and distinct frequencies and not for others, the two frequencies being again arranged within the lasing linewidth of the ruby laser. There is again produced a laser output beam 18 which may be used with the holographic apparatus shown in FIG. 1.

Instead of using a prism 43 it is also feasible to use instead a grating. Also where the dispersion of a prism may prove insufficient, it is feasible to increase the dispersion by the use of a suitable etalon or interferometer such as a Lummer-Gehrke plate or the like. In any case, there should be provided some optical means such as a resonant reflector, a prism or interferometer for selecting at least two or more lines, each having a frequency within the lasing linewidth of the laser.

There has thus been disclosed holographic apparatus for recording holograms of an object having range contours when the holograms are viewed. These range contours may be generated by a single laser pulse of short duration. Accordingly they may be made of objects which are not normally considered to be stationary, and the only requirement being that the object be stationary within a fraction of a wavelength during the duration of the laser pulse. The contour spacing is controllable by the selection of to or more frequencies within the lasing linewidth. This spacing corresponds, for example, to the optical thickness of a resonant reflector. The invention may be practiced with any pulsed laser, such as a ruby or neodymium laser.

What is claimed is:

1. A holographic apparatus for taking holograms of an object and providing range contours on the object when the hologram is viewed, said apparatus comprising:
   a. a pulsed laser including a lasing medium;
   b. first optical means for pumping said laser, said laser having a given lasing linewidth;
   c. an optical cavity enclosing said lasing medium; and including a light reflector for the coherent light developed by said laser defining one end of said cavity, said light reflector and second optical means defining the other end of said cavity for selecting at least two lines, each having a frequency within said lasing linewidth, the difference in frequency between said lines being such that range contours are produced on the object to be recorded and have a spacing of no less than about 5 millimeters;
   d. means for splitting the light from said laser into a scene beam and a fixed reference beam;
   e. a light-sensitive recording medium disposed in a predetermined plane; and
   f. means for directing said reference beam onto said recording medium and for directing said scene beam onto the object and then onto said recording medium.

2. A holographic apparatus as defined in claim 1 wherein said pulsed laser is a ruby laser.

3. A holographic apparatus as defined in claim 1 wherein said pulsed laser is a neodymium laser.

4. A holographic apparatus as defined in claim 1 wherein said second optical means consists of an interferometric device for separating the light paths of the light from said laser in accordance with each of the frequencies of the light.

5. A holographic apparatus as defined in claim 1 wherein said second optical means consists of a prism.

6. A holographic apparatus as defined in claim 1 wherein said second optical means consists of a Fabry-Perot resonant reflector.

7. A holographic apparatus as defined in claim 6 wherein said resonant reflector consists of a slab of sapphire.

8. A holographic apparatus as defined in claim 6 wherein said resonant reflector consists of two spaced slabs of quartz.

9. A holographic apparatus as defined in claim 6 wherein said resonant reflector has an optical thickness selected to permit lasing of said laser at at least two separate frequencies, each being disposed within said lasing linewidth.

10. A holographic apparatus as defined in claim 6 wherein the optical length of said optical cavity is an integral multiple of the optical thickness of said resonant reflector.

11. Holographic apparatus for recording a hologram of an object to be recorded and for providing contour lines on the object when the hologram is viewed, said apparatus comprising:
   a. a pulsed laser including a ruby rod;
   b. optical means for pumping said ruby rod, said laser generating substantially coherent light having a given lasing linewidth of about 0.25 A.;
   c. said ruby rod being enclosed by an optical cavity, said optical cavity comprising a light reflector to define one end of said cavity and a Fabry-Perot resonant reflector defining the other end of said cavity, said resonant reflector having an optical thickness such as to select at least two frequencies within said lasing linewidth and providing sufficient gain for causing said laser to lase within said selected frequencies, said optical cavity having an optical length which is a multiple of the optical thickness of said resonant reflector;
   d. means for splitting the laser beam into a scene beam and a fixed reference beam;
   e. a light-sensitive recording medium disposed in a predetermined plane; and
   f. means for directing said reference beam onto said recording medium and for directing said scene beam first onto recording medium.

UNITED STATES PATENT OFFICE
CERTIFICATE OF CORRECTION

Patent No. 3,603,685                      Dated  November 9, 1971

Inventor(s) Lee O. Heflinger, Ralph F. Wuerker

It is certified that error appears in the above-identified patent and that said Letters Patent are hereby corrected as shown below:

Column 2, line 7 "light-sensitive recording medium" should be cancelled and --hologram-- inserted thereto.

line 9 "hologram" should be cancelled and --light sensitive recording medium-- inserted thereto.

Column 3, line 25 after "recording medium" the numeral --25-- should be inserted thereto.

line 50 after "is" the word --a-- should be inserted thereto.

Column 4, line 18 "applicant's" should be cancelled and --applicants'-- inserted thereto.

line 37 "applicant's" should be cancelled and --applicants'-- inserted thereto.

Column 6, line 49 before "recording medium" the words --the object to be recorded and then-- should be inserted thereto.

Signed and sealed this 25th day of April 1972.

(SEAL)
Attest:

EDWARD M. FLETCHER, JR.
Attesting Officer

ROBERT GOTTSCHALK
Commissioner of Patents